March 7, 1944. R. R. ROEMER 2,343,243
POWER OPERATED MACHINE TOOL
Filed July 31, 1940 5 Sheets-Sheet 1

INVENTOR.
Ralph R. Roemer
BY Harry P. Canfield
ATTORNEY.

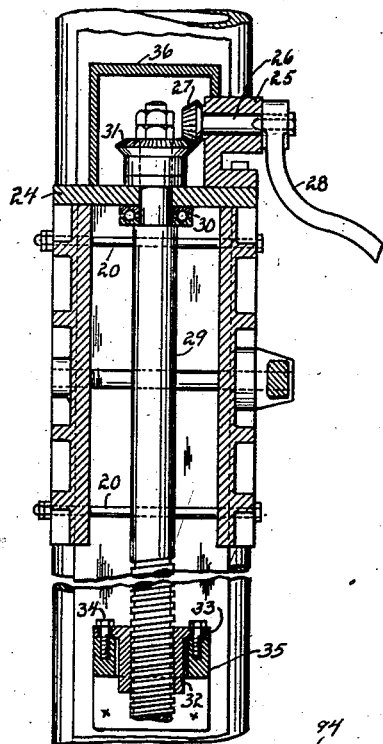

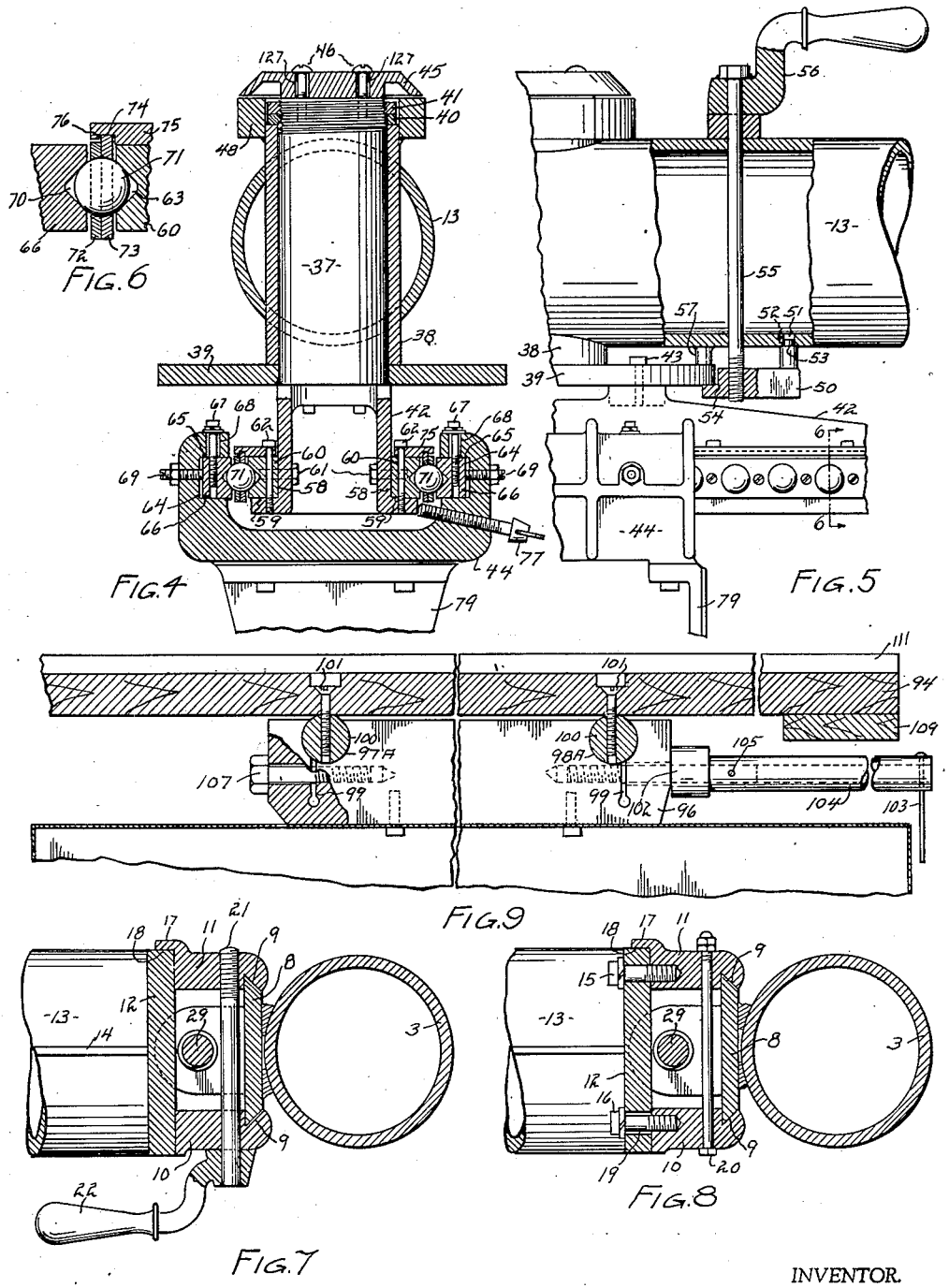

March 7, 1944.  R. R. ROEMER  2,343,243
POWER OPERATED MACHINE TOOL
Filed July 31, 1940  5 Sheets-Sheet 4

INVENTOR.
Ralph R. Roemer
BY Harry P. Canfield
ATTORNEY.

March 7, 1944.    R. R. ROEMER    2,343,243
POWER OPERATED MACHINE TOOL
Filed July 31, 1940    5 Sheets-Sheet 5

INVENTOR.
Ralph R. Roemer
BY Harry P. Canfield

Patented Mar. 7, 1944

2,343,243

UNITED STATES PATENT OFFICE 2,343,243

POWER OPERATED MACHINE TOOL

Ralph R. Roemer, Cleveland, Ohio

Application July 31, 1940, Serial No. 348,943

5 Claims. (Cl. 143—6)

This invention relates to machine tools of the type comprising a power driven rotary tool; and has particular application to power driven rotary tools that are variably positionable with respect to work to be operated upon.

A machine tool of this type constitutes the subject matter of my patent, No. 1,956,835, dated May 1, 1934; and the machine tool of this application is an improvement over that of the patent. Subject matter illustrated and described herein but not claimed is being claimed in my copending applications, Serial Number 450,527, filed July 11, 1942 and Serial Number 450,528, July 11, 1942.

The machine tool of this application comprises generally, as parts of a main frame, a vertical column supporting a horizontal arm which extends over a work table. The arm supports a horizontal trackway; and a motor driven rotary tool, particularly a saw or the like, is supported by a carriage reciprocable along the trackway. The trackway is mounted on the arm so as to swing on a vertical axis, and can be locked in any desired swung position, to determine the direction of movement of the carriage and saw; and a dial scale is provided to accurately determine the angular position of the trackway.

The saw and motor are mounted on the carriage so as to swing on a horizontal axis thereon, and may be locked in any desired angular position to determine the angle of the rotational plane of the saw or like tool with respect to the work table; and a dial scale is provided to selectively determine the saw angle.

Mechanism is provided to raise and lower the arm and tool relative to the work table and to lock them in any elevational position.

The work is supported on a table-top which is reciprocable toward and from the column to vary its position with respect to the saw; and means is provided to lock the table-top in all positions.

With reference to a machine tool of this general character, it is among the objects of the invention:

To provide an improved construction of column and arm;

To provide an improved elevating mechanism for the arm and tool;

To provide an improved trackway and swinging support and lock therefor;

To provide an improved carriage and antifriction bearing therefor for movement on the trackway;

To provide an improved support for the motor and saw on the carriage, and swinging support and lock therefor;

To provide an improved work table and tabletop and top support and positioning and locking means therefor;

To provide improved means for adjusting the fit of relatively movable parts to insure accuracy of operation of the machine;

To provide an improved dial scale and adjustments therefor;

To provide improved means to adjust the parts of the machine to insure accurate alignment and accuracy of movement of the parts of the machine to insure accurate work by the tool.

To provide an improved construction of frame or base upon which the column may have a rigid mounting.

Other objects will be apparent to those skilled in the art to which my invention appertains.

My invention is fully disclosed in the following description taken in connection with the accompanying drawings in which:

Fig. 3 is a front elevational view of the tool of Fig. 1, considered as taken from the left side of Fig. 1;

Fig. 4 is a sectional view taken from the plane 4—4 of Fig. 1;

Fig. 5 is a view to enlarged scale of a part of Fig. 1 with a tubular arm and other parts thereof in section, and the view may be considered as taken from the plane 5—5 of Fig. 2;

Fig. 6 is a fragmentary view to enlarged scale of a part of Fig. 4, and the view may be considered as taken from the plane 6—6 of Fig. 5;

Fig. 7 is a fragmentary sectional view to enlarged scale taken from the plane 7—7 of Fig. 1;

Fig. 8 is a view similar to Fig. 7 but taken from the plane 8—8 of Fig. 1;

Fig. 9 is a sectional view taken from the plane 9—9 of Fig. 1;

Fig. 10 is a sectional view taken from the plane 10—10 of Fig. 1;

Fig. 11 is a fragmentary view of a part of Fig. 1, with parts broken away and parts in section;

Fig. 12 is a sectional view taken from the line 12—12 of Fig. 3;

Fig. 13 is a view to enlarged scale of a part of Fig. 3;

Fig. 15 being a cross-sectional view taken from the plane 15—15 of Fig. 14;

Figure 2:
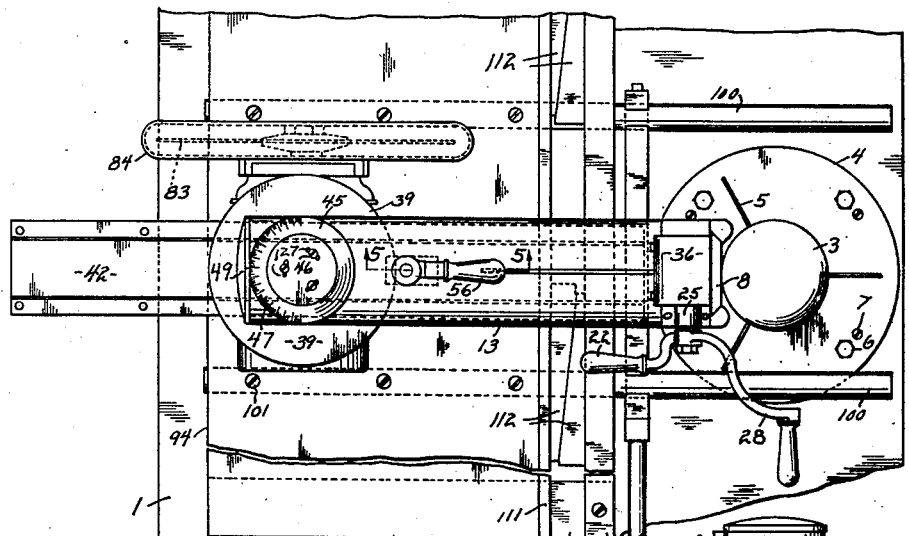
Fig. 2 is a top plan view of the machine tool of Fig. 1.
Figure 1:
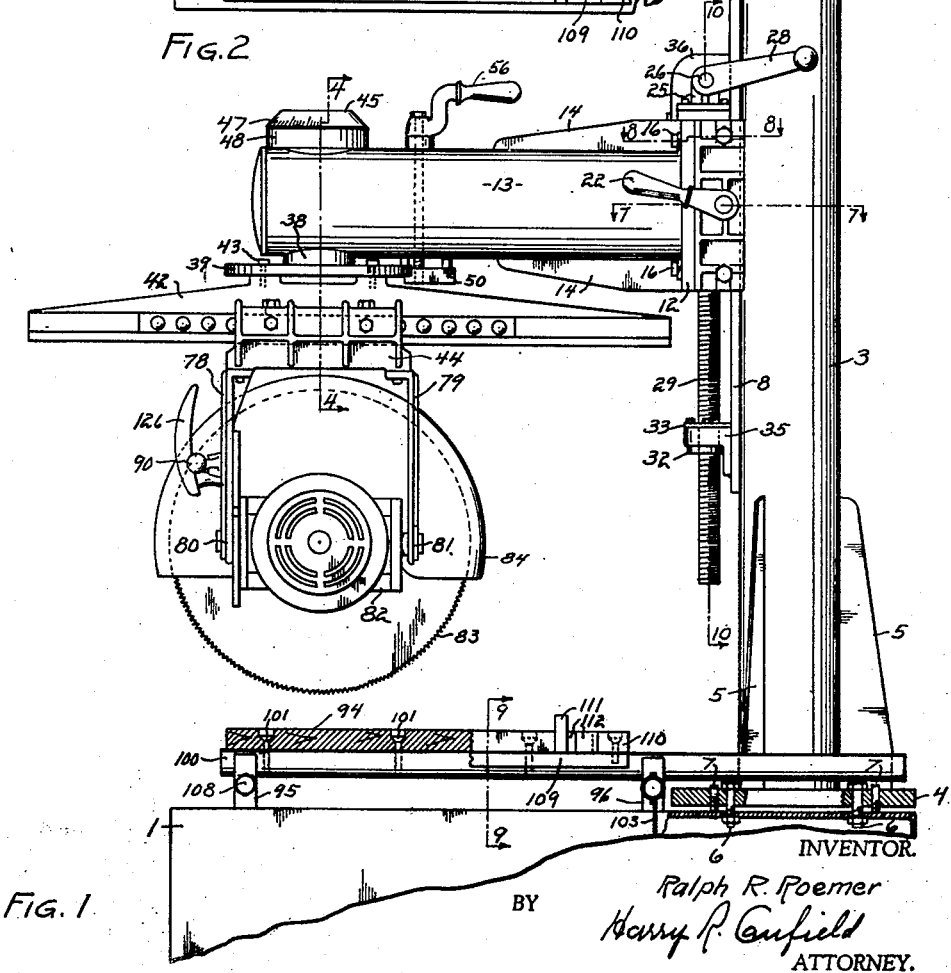
Fig. 1 is a side elevational view of a machine tool embodying my invention.

Referring to the drawings, Figs. 1, 2 and 3, I have shown generally at 1, a main base or table, provided with supporting legs 2—2. While this table may be variously constructed, and the preferred construction will be presently described, it is here illustrated in simplified form. Upon the top of the table, and at the rearward side thereof, is mounted a vertical column 3, preferably in the form of a steel tube, Fig. 7, secured, for example by welding, at its lower end to a steel flange 4, which is preferably circular in form; and the column is braced to the flange 4 by ribs 5—5, welded to the column and to the flange; and the flange 4 is secured to the top of the table 1 by bolts 6—6 and adjusting screws 7—7.

The bolts are projected through perforations in the flange 4 and through the upper surface of the main base or table, as shown in Figs. 1 and 13, and the screws 7 are threaded in the flange 4 and engage the upper side of the table. By loosening a bolt 6 and screwing in the corresponding screw 7, or by loosening the screw 7 and tightening the corresponding bolt 6, the column 3 may be adjusted into true vertical position or into such position that the tool moving back and forth along the trackway, as will be described, will move parallel to the work-tabletop in either cross-cutting or ripping.

Upon the forward face of the column is welded a guide 8, see Figs. 7 and 8, having opposite vertical angular guideways 9—9, upon which is vertically slidable a pair of slides 10 and 11 to which is bolted a vertical flange 12 forming part of a horizontal arm 13.

The arm 13 is preferably in the form of a steel tube, see Figs. 4 and 5, with the flange 12 welded thereto, and bracing ribs 14—14 welded to the flange 12 and to the outer wall of the tube 13, brace the same and render it rigid.

The flange 12 is secured to the slides 10 and 11 by bolts 15 and 16. The slide has a shoulder 17 which overlaps a vertical planar edge 18 of the flange 12 to position the slide 11, and the slide 11 is rigidly bolted to the flange by the bolt 15. The slide 10 is secured to the flange 12 by the bolt 16 in an oversized hole 19, Fig. 8. Bolts 20—20, Figs. 8 and 10, are provided to draw the slide 10 toward the slide 11, the oversize holes 19 permitting such adjustment to cause the slide to slip and slidably grip the guide 8, and when so adjusted the bolt 16 is drawn up tight.

In the operation of the parts to be described, while the slides 10 and 11 are fitted as just described to slide without lost motion on the guide 8, the slides and therefore the flange 12 and arm 13, may be locked in any elevated position on the guide 8 by clamping means shown in Fig. 7, comprising a bolt 21 passing through a bore in the slide 10 and threaded into the slide 11 and having a handle 22 welded to the bolt whereby upon turning the handle the bolt propels the slide 10 toward the slide 11 rigidly gripping the guide 8 therebetween in a locking clamping manner.

When the handle 22 is operated to free these slides, they and the arm 13 may be moved to change the elevation thereof by the following means, see Figs. 10 and 11.

Upon the upper side of the flange 12 is secured by a plurality of bolts 23, one of which is shown in Fig. 11, a horizontal plate 24. A gear bearing 25 is bolted upon the plate 24, Fig. 10, in which is rotatably supported a shaft 26 carrying a bevel gear 27, the shaft being connected to a crank 28. An elevating screw 29 having a thrust bearing 30 on the underside of the plate 24, extends upwardly therethrough, and has a bevel gear 31 secured thereto and meshed with the gear 27. The screw extends downwardly between the slides 10 and 11, Figs. 8 and 10, and the threads thereof mesh with a nut 32 mounted on the forward face of the column 3 or upon the guide 8. The nut 32 is formed integral with a flange 33 and bolts 34—34 passing through oversize holes in the flange 33, secure the nut to a bracket 35, the bracket being secured to the column as by welding. The bolts 34 are threaded into the bracket 35, but by passing through the oversize holes in the flange 33 permit the screw to be shifted to axially align it with the column or with the guide 8 when the bolts 34 are loosened, whereby when the bolts are tightened, the screw may turn freely without binding during travel of the screw through the nut.

From the foregoing it will now be apparent that upon loosening the slides 10 and 11 by the handle 22, and upon then rotating the crank 28, the screw 29 will be turned, and, reacting upon the nut 32 will thrust upwardly through the bearing 30 upon the plate 24 and cause the slide and the arm to be raised or lowered, thereby raising or lowering the tool to be referred to; and after a desired degree of elevation has thus been attained, the slides may be clamped upon the guideway 8 by the handle 22. The weight of the arm and tool while being adjustably elevated is carried by the plate 24, and transmitted to the screw 29.

The gears 27 and 31 may be covered by a gear housing 36 bolted to the plate 24.

In the outer end portion of the arm 13 is screwed, as by welding, a stem tube 38, having a vertical axis, or an axis parallel to the guideway 8, and rotatably mounted in the tube 38 as in a bearing, is a stem 37, Fig. 4. Upon a lower portion of the stem 37 is secured, as by welding, a plate 39 in the form of a disc, and upon the upper end of the stem is threaded a bearing nut 40, resting upon the upper end of the tube 38, and at 41 is a lock nut for the nut 40. By adjustably turning the nut 40, the plate 39 is drawn against the lower end of the tube 38, with rotational clearance, the nut 40 and the disc 39 thus being caused to abut the opposite ends of the tube 38 to rotatably position the stem 37 therein.

A carriage trackway illustrated generally at 42 is secured to the underside of the disc 39, for example by bolts 43—43, Figs. 1 and 5; and by virtue of the bearing-supported-stem 37, the entire trackway 42 may be rotated about the axis of the stem; and a tool supporting carriage, shown generally at 44, is provided arranged to be moved horizontally along the trackway 42, see Figs. 1, 4, 5 and 6.

A circular dial 45, Figs. 4, 2 and 1, is secured upon the upper outer end of the stem 37 by screws 46 and is graduated in degrees, as at 47. A ring 48 is secured, as by welding, to the tube 38, and a reference line 49, see Figs. 2 and 3, is provided on the ring with reference to which the dial 45 may turn to indicate the position of the trackway.

The trackway may be locked in any swung position around the axis of the stem 37 by the following means, Figs. 1 and 5. A dog 50 is provided on the underside of the arm 13 and hingedly connected thereto. This hinging connection may be variously provided, but I prefer to provide a perforation 51 in the underside of the arm, and project a reduced diameter portion 52 of the dog loosely into the perforation, with a corresponding shoulder 53 of the dog, resting against the underside of the arm. The dog has a notch 54 therein engaging the periphery of the disc 39. A bolt 55 is projected downwardly through aligned perforations in the upper and lower sides of the arm 13, the lower end of the bolt being threaded into the dog 50. The upper end of the bolt is connected, as by welding, to a handle 56 above the arm. By rotating the handle the bolt 55 draws the dog upwardly, clamping it upon the disc periphery, and the friction thereby effected locks the disc to the arm. Upon rotating the handle 56 in the other direction the disc is freed and the trackway may be swung by hand around the axis of the stem 37. Preferably I provide an abutment 57 welded to the underside of the arm 13 and just clearing the upper face of the disc 39, whereby upon raising the dog by the handle 56, the disc is clamped between the dog and the abutment 57.

The trackway 42 is machined on each side to provide parallel-extending seats 58 and 59, the seats being planar and at right angles to each other as well as parallel longitudinally; and track raceways 60—60 are seated upon the said seats 58 and 59, and secured thereon by bolts 61 clamping the raceways upon the seats 58, and by bolts 62, clamping the raceways upon the seats 59, and the raceways are provided with concave ball races 63, see Fig. 6.

The carriage 44 is provided with grooves or elongated recesses 64—64 on opposite sides of and confronting the trackway, the grooves having horizontal planar seats 65—65 upon which rest carriage raceways 66—66, the same being clamped against the seats 65 by bolts 67—67, passing through oversize bores 68 in the carriage and being threaded into the raceways 66—66. Adjusting screws 69—69 are provided, the inner ends of which abut upon the raceways 66, and by turning the screws the raceways 66—66 may be moved toward or allowed to recede from the raceways 60—60, and then the bolts 67—67 may be tightened to clamp the raceways 66—66 in adjusted positions. The raceways 66 have concave races 70 therein, see Fig. 6, and balls 71 roll in the races 63 and 70. The raceways 60 and 66 are made from hardened ground steel, and being detachable as described, are removable.

A plurality of such balls 71 are provided for each of the pairs of races 63 and 70, and the balls are spaced apart along the races 63 by a cage construction, best shown in Fig. 6, comprising a pair of plates 72 and 73 of suitable material such as reinforced plastic. The plates 72 and 73 are superimposed one upon the other and secured together by any suitable means such as adhesive or bolts or rivets, not shown.

The plates are provided with aligned perforations the peripheries of which are generally frusto-conical as shown in Fig. 6, so that when the perforations are telescoped over the balls from opposite sides thereof and the plates are secured together, the balls are trapped therein, but with enough clearance to permit them to rotate in the perforations. The raceways are mounted in the position illustrated by making one of the plates, such as 73, wider than the other thereby providing an upstanding edge 74, and a guide plate 75 is provided secured to the upperside of the raceway 60 by the aforesaid bolts 62 and having a notch 76 loosely embracing the edge 74 to hold the plates upright, but allowing them to move or float longitudinally.

By the arrangement just described, the carriage 44 hangs, by virtue of its raceways 66—66, upon the balls 71—71, and the balls rest upon the raceways 60—60; and the carriage is thereby supported upon the trackway 42 and movable longitudinally thereover substantially without friction, the balls rotating freely on the raceways and without lost motion by virtue of the adjustment provided by the screws 69—69. The cages float longitudinally with movements of the carriage, being propelled by the balls.

The carriage may be locked against movement when desired by a wing screw 77, Fig. 4. threaded through the carriage 44 and engageable with the trackway 42.

Secured to the underside of the carriage 44 and depending therefrom are hangers 78 and 79, Fig. 1, and in the lower portions of the hangers are trunnion bearings 80 and 81 of any suitable construction, having a common axis, and a motor, the housing of which is shown at 82, is supported on the trunnion bearings, and rocks thereon. A tool such as a wood saw 83 is mounted on the shaft of the motor and may be provided with a guard 84.

A plate 85, which may be a casting, and having an arcuate slot 86 therein, is secured to the motor housing, see Figs. 3 and 12, by bolts 88; and a bolt 87 with the head 89 inwardly of the slot, extends through the slot and through the hanger 78 and is threaded into a handle 90. By loosening the handle 90, the motor housing may be rocked around the trunnion bearing 80 and 81, and then by tightening the handle the motor housing may be locked in position, by the bolt 87 clamping the plate 85 against the hanger 78. Any well known means, not shown, may be provided to prevent the bolt 87 from turning.

The plate 85, see Figs. 3 and 13, has a scale 91 graduated in degrees, concentric with the trunnion axis, and a scale finger 92 is secured upon the hanger 78 by a screw 93, and by moving the scale under the finger the scale indicates in degrees the rotative adjusted position of the motor and saw.

A work-table-top 94, preferably made of wood, is mounted on the table or base 1 for reciprocation toward and from the column 3. To this end, a forward and a rearward support 95 and 96 of metal, are mounted on the top of the table, and the forward support is provided with a pair of laterally spaced apertures 97 and 98, Fig. 3, aligned with a corresponding pair of apertures 97A and 98A, Fig. 9, in the rearward support. These apertures are upwardly open and are circular or part circular and the peripheries thereof communicate with slots 99—99 by which the opposite walls of the perforations are made resilient. Bars 100—100 are mounted reciprocably in the apertures 97—97A and 98—98A substantially fitting the same.

The work-table-top 94 of wood is secured to the bars by screws 101—101 projected downwardly through the table top and threaded into the bars. By this construction, the table-top may be reciprocated toward and from the column 3 and to secure it in any determined position, a bolt 102 is provided threaded into the support 96 below the aperture 98A and at the other end of the bolt a handle 103 is provided. By turning the bolt 102 by the handle, the aperture 98A is contracted and the bar 100 is gripped to the support 96, thereby locking the work-table-top against reciprocatory movement.

Conveniently, the handle 103 may be secured in a tube 104, telescoped over the bolt 102 and secured to the bolt by a pin 105. See Fig. 9.

Other bolts 106, 107, 108, Figs. 3 and 9, may be threaded into the supports below the other apertures 97, 97A, 98 to adjust the fit of these apertures with the bars 100—100 reciprocable therein to take up lost motion.

The work-table-top 94 has forwardly and rearwardly extending cleats 109—109 on the underside thereof; and mounted thereon and rearwardly of the table top proper is a transverse back-strip 110, Figs. 1 and 2. A fence 111 is laid upon the cleats 109—109 engaging the rearward edge of the table-top 94; and wedges 112—112 are driven in between the fence and the back strip to detachably mount the fence.

Figure 14:
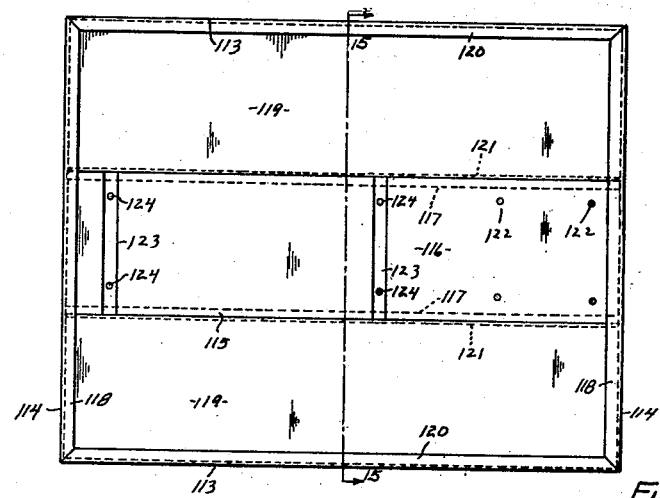
Figs. 14 and 15 are views illustrating the preferred construction of the main base or table, which has been shown in more simplified form in the foregoing figures, Fig. 14 being a top plan view of the table or base with parts to be mounted thereon omitted.
Figure 17:
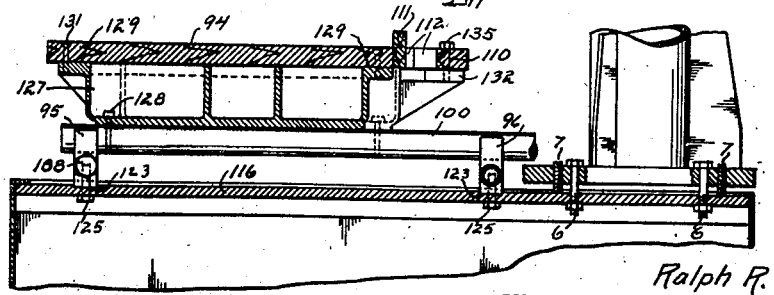
Fig. 17 is a forward and rearward longitudinal sectional view of the top portion of the table of Figs. 14 and 15 with the column of the tool mounted thereon and showing in longitudinal section the table-top and the supports therefor of Fig. 16.

While as stated above the supporting table or base may be variously constructed, I prefer to provide the form of construction shown in Figs. 14 and 17.

Figure 15:
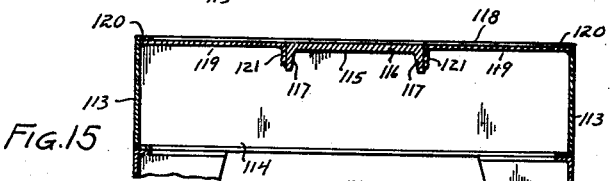

Sheet metal is bent into channel form, and four channels, namely, side channels 113—113 and front and rear channels 114—114 are secured together by welding with the flanges of the channels inwardly disposed, as illustrated in Figs. 14 and 15. A channel 115 of heavy cross section comprising a web 116 and flanges 117—117 is provided of such length as to rest at its ends under the upper flanges 118—118 of the forward and rearward channels 114—114, and is welded to these channels. Sheet metal angle pieces 119—119 are laid on the under side of the said flanges 118 and under the corresponding flanges 120—120 of the side channels 113—113 and themselves have flanges 121—121 lying against the flanges 117 of the channel 115, and these parts are all welded together providing a substantially planar table upper surface, with the web 116 of the channel 115 extending longitudinally therein. The channel 115 is provided with four perforations 122—122 to receive the bolts 6, Fig. 17, and is also provided with transverse forwardly and rearwardly spaced grooves 123—123 and transversely spaced pairs of perforations 124—124 are provided in the grooves. The above described forwardly and rearwardly spaced supports 95 and 96 are seated in the said grooves, see Fig. 17, and are secured therein by bolts 125—125 projected upwardly through the perforations in the web 116 and threaded into the supports.

In the following is set forth in general, the mode of operation and the advantages of the above described tool.

The tool 83 to be driven by the motor 82 has been illustrated as a saw, such as a wood-working saw, inasmuch as this type of tool demonstrates the usefulness of the machine, but it will be understood that various other types of rotary tools may be utilized as is well known of machine tools of this class.

Work to be sawed is laid upon the table-top 94 and against the fence 111 to position it, say for cross-cutting. The trackway 42 is rotated on the arm 13 until the scale 47 registers zero or 90° with the mark 49 on the arm, and then the saw is reciprocated by moving the carriage 44 along the trackway by means of a handle 126 on the hanger 78. If it be desired to cross-cut entirely through the wood, the tool 83 is lowered sufficiently for this purpose by the crank 28, after first loosening the slides by the handle 22, and then again fastening them by this handle.

To ripcut, the handle 56 is loosened and the trackway 42 is rotated through 90° as indicated by the scale 47, and is then fastened again by the handle 56; and the saw is reciprocated by the handle 126. To change the width of the ripcut, the table-top 94 is first loosened by the handle 103, and the table is then reciprocated until the distance from the saw to the fence 111 is that desired; and then the table is again fastened by the handle 103.

To position the saw for right or left miter cut, the trackway 42 is moved to the desired angle indicated by the scale 47, after loosening the handle 56, and again fastened in that position by the handle.

For bevel-cutting, the motor housing is loosened by the handle 90 and rocked to the desired bevel position as indicated by the finger 92 on the scale 91, and then locked in that position by the handle 90.

Bevel-cutting thus may be performed in the right angle cross-cut direction, or in the miter directions or in the rip direction, as will be understood.

The aforesaid scales 47 and 91 indicate the desired positions of the tool, and the machine can be adjusted to insure that in all positions of the tool, it will move accurately along the intended direction and at the intended angle.

To this end, the column 3 may be adjustably moved to dispose the rotational axis of the stem 37 perpendicular to the table-top 94, this being effected by the bolt and screw arrangement, 6—7, as described.

To insure that in cross-cutting the saw will travel at right angles to the fence 111, and that in ripping it will cut parallel thereto, the dial scale 47 may be accurately positioned. To do this, the trackway 42 is experimentally swung to an accurate position for these purposes; and the dial 45 is then rotated to indicate zero or 90° at the mark 49 by loosening the screws 46 and turning the dial 45, slots 127 being provided in the dial, as shown in Figs. 2 and 4, for this purpose.

To insure that the scale 91, Fig. 13, will accurately indicate the position of the saw for bevel cutting, the saw may be experimentally accurately positioned, and then the dial finger 92 may be moved, after loosening the screw 93, until the finger indicates accurately, on the scale 91, the position of the saw and then the screw may be tightened.

When these adjustments have once been made, the tool may thereafter be set accurately by reference to the said graduated scales.

For ripping it is sometimes desirable to set the saw at a slight angle with the fence, the angle differing with different work as indicated by experience; and this angle or "lead," as desired may be read on the scale 47 and the saw set accordingly.

Figure 16:
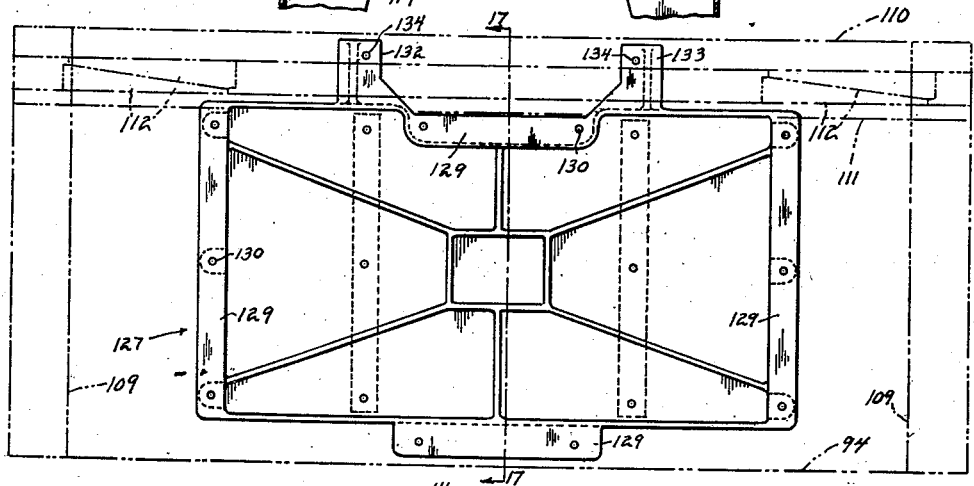
Fig. 16 is a top plan view illustrating a modification of the means of the foregoing figures for mounting a work-table-top on the main base or table, the view illustrating in plan particularly a casting which I may employ and showing in broken line a work-table-top thereon.

In Figs. 16 and 17 is illustrated a further modification of the means for supporting the work-table-top 94. A casting 127 is made preferably of aluminum or other light weight material, and webbed for lightness and strength, as illustrated in these figures. This casting is bolted to the above described bars 100 by bolts 128 projecting downwardly through perforations in the casting and threaded into the bars. The upper side of the casting is provided with planar surfaces 129, having threaded holes therein at 130—130; and the work-table-top proper 94, of wood, is screwed to the upper side of the casting by screws 131 projected downwardly through the table-top into the holes 130.

Extensions 132 and 133 are formed integral with the casting and provided with threaded holes 134 and upon which, as well as upon the cleats 109, the aforesaid back rail 110 may be secured by bolts 135; and the fence 111 may rest upon a part of the upper planar surface; and be secured by wedges 112, resting on the cleats 109—109, or upon the extensions 132—133, or frictionally supported in the intermediate position illustrated.

Figure 18:
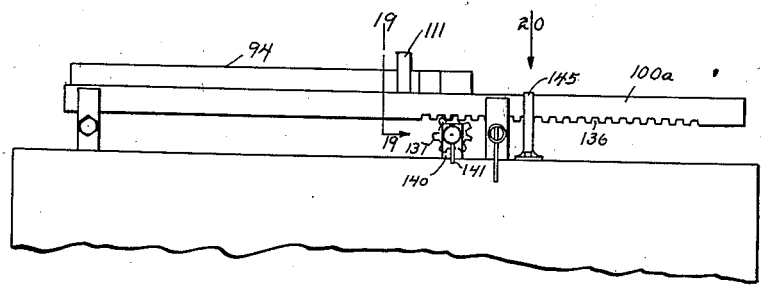
Fig. 18 is a view corresponding to a part of Fig. 1 but illustrating additional means for positioning a work-table-top thereof.
Figure 20:
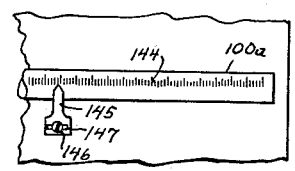
Fig. 20 is a fragmentary view taken from the direction of the arrow 20 of Fig. 18.
Figure 19:
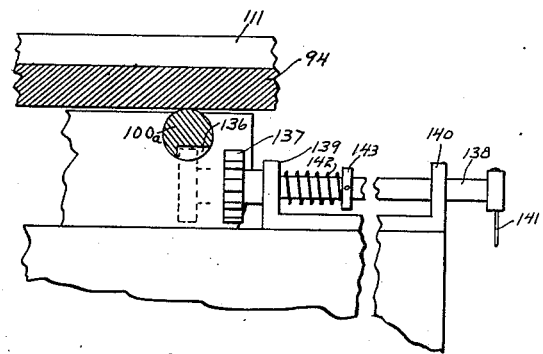
Fig. 19 is a sectional view taken from the plane 19—19 of Fig. 18.

In the operation of the tool above described, a sufficiently accurate positioning of the table-top 94 is accomplished in most cases by moving it by hand. For example, to determine the width of a ripcut, the distance from the fence 111 to the saw blade may be measured with a pocket rule. In Figs. 18 to 20, however, is illustrated a construction by which the table-top, after it has been moved to approximately the desired position, may be given a micrometer movement in connection with a scale, to accurately position it without other measuring thereof.

One of the bars 100a has formed on the underside thereof a rack 136. A pinion 137 is mounted upon a shaft 138, the latter being rotatively supported in spaced bearings 139 and 140, mounted on the base 1. A handle 141 is provided on the outer end of the shaft 138. A spring 142 surrounding the shaft and abutting upon the bearing 139 at one end and at the other end abutting upon a collar 143 on the shaft 138, normally holds the shaft to dispose the pinion 137 out of engagement with, but adjacent to, the rack teeth 136.

Upon pushing inwardly on the shaft 138, the pinion teeth will be engaged with the rack teeth, and then upon turning the shaft 138 by the handle 141, the said bar 100a will be propelled forwardly or rearwardly, as will be clear.

A scale in inches or the like, as shown at 144 is provided on the upper side of the bar 100a, and a scale finger 145 is mounted on the base by a bolt 146 projected through an elongated slot 147 in the finger whereby the finger 145 may, at the outset, be accurately positioned to indicate in inches the accurate position of the fence 111 with respect to the tool. Thereafter the scale 144 and the indication thereon by the finger 145 will accurately indicate the position of the fence 111, and the scale 144 may be accurately moved under the finger 145 by the handle 141 and pinion 137, as described above.

When a great change of position or great movement of the table-top 94 is desired, it may be moved forwardly or rearwardly by hand, since the pinion 137 is normally out of engagement with the rack teeth 136, and then for the last, or micrometer part of the movement, the pinion 137 may be used to finally position the table-top; and it then may be clamped in such a position, by the means described hereinbefore.

My invention is not limited to the exact details of construction illustrated and described herein, but is comprehensive of all changes and modifications thereof which come within the scope of the appended claims.

I claim:

1. In a machine tool, a base; a generally horizontal arm supported above the base; a horizontal trackway mounted on the arm on a vertical bearing axis to swing in a horizontal plane for variably adjustably positioning the trackway; a tool movable on the trackway; means to fix the trackway in any adjusted position comprising a circular disc connected to the trackway and having its peripheral portion co-axial with said arm bearing; an abutment on the arm adjacent to the disc periphery a screw-threaded element on the arm, and a handle for turning it, and a lever hingingly connected to the arm overlapping the disc peripheral portion and arranged to be moved upon rotation of the screw-threaded element to clampingly engage the disc between the lever and the abutment to lock it against rotation.

2. In a machine tool, a frame; a horizontal arm on the frame; a horizontal trackway; a tool movable on the trackway; means to support the trackway on the arm to rotatably swing in a horizontal plane to adjust its position and to lock it in any adjusted position, comprising a vertical stem connected to the trackway; a disc connected to the stem and trackway and co-axial with the stem; the arm being provided with a vertical bearing bore and the stem being rotatably mounted in the bore; an abutment on the stem spaced from the disc for engaging the opposite ends of the bore between the abutment and the disc; a lever movably hinged to the arm and having a portion overlapping the peripheral portion of the disc; lever-operating means supported on the arm and connected with the lever, and comprising an operating handle operable to cause the lever to grippingly engage the disc peripheral portion to lock the disc, stem and trackway against rotation relative to the arm.

3. In a machine tool, a main base; an upright column on the base; a pair of vertical, spaced-apart, stationary, parallel, wedge-form guideways on the column; a slide comprising two slide elements formed to wedgingly embrace the guideways therebetween; an overhanging tool-supporting arm connected to both slide elements; the connection of one slide element to the arm being an adjustable, movable connection first loosening of which releases the slide element for movement thereof toward the other slide element, and then tightening of said connection secures said slide element to the arm in adjusted position; operable screw means for effecting micrometer adjusting movement of the said slide element; handle-operable clamp means operable to force the slide elements toward each other; and the slide assembly thereupon resiliently yielding to effect gripping of the guideways between the slide elements.

4. In a machine tool, a frame; a laterally extending arm on the frame supporting a horizontal trackway; a tool reciprocable on the trackway; means to support the trackway on the arm to rotatably swing in a horizontal plane to adjust its position, and to lock it in any adjusted position, comprising a vertical stem connected to the trackway; a disc connected to the trackway, and co-axial with the stem, and below the arm; the arm being provided with a vertical bearing bore, and the stem being rotatably mounted in the bore; a screw extending through the arm and rotatably supported therein; a handle on the screw above the arm for turning the screw; a clamp device below the arm operable by the screw to grip the disc to lock it against rotation upon turning the screw by the handle.

5. In a machine tool, a frame; a horizontal arm on the frame; a horizontal trackway; a tool movable on the trackway; means to support the trackway on the arm to rotatably swing in a horizontal plane to adjust its position, and to lock it in any adjusted position, comprising: a vertical stem connected to the trackway; a disc connected to the trackway and co-axial with the stem; the arm being provided with a vertical bearing bore and the stem being rotatably mounted in the bore; a shoulder carried by the trackway and co-axial with the stem and adjacent to the lower end of the bearing bore; an abutment on the upper end of the stem and engaging the upper end of the bearing bore to support the trackway; the abutment being adjustable on the stem toward and from the shoulder; a lever device having hinging connection with the arm and having a portion overlapping the peripheral portion of the disc; lever device operating means supported on the arm and comprising an operating handle to cause the lever device to engage the disc peripheral portion to lock the disc, stem and trackway against rotation relative to the arm.

RALPH R. ROEMER.